United States Patent
Chen et al.

(10) Patent No.: US 10,887,882 B2
(45) Date of Patent: Jan. 5, 2021

(54) TECHNIQUES FOR DUAL-MODE OPERATIONS IN NEW RADIO

(71) Applicant: QUALCOMM Incorporated, San Diego, CA (US)

(72) Inventors: Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/412,020

(22) Filed: May 14, 2019

(65) Prior Publication Data

US 2019/0268910 A1    Aug. 29, 2019

Related U.S. Application Data

(63) Continuation of application No. 15/920,043, filed on Mar. 13, 2018, now Pat. No. 10,334,601.

(60) Provisional application No. 62/476,472, filed on Mar. 24, 2017.

(51) Int. Cl.
| | |
|---|---|
| *H04L 12/28* | (2006.01) |
| *H04W 72/04* | (2009.01) |
| *H04L 5/00* | (2006.01) |
| *H04J 1/16* | (2006.01) |
| *H04W 88/06* | (2009.01) |
| *H04W 8/22* | (2009.01) |

(52) U.S. Cl.
CPC ......... *H04W 72/0453* (2013.01); *H04L 5/001* (2013.01); *H04L 5/0064* (2013.01); *H04W 72/048* (2013.01); *H04L 5/0023* (2013.01); *H04W 8/22* (2013.01); *H04W 88/06* (2013.01)

(58) Field of Classification Search
CPC .................................................. H04W 72/0453
USPC ........................................ 370/252, 329, 430
See application file for complete search history.

(56) References Cited

U.S. PATENT DOCUMENTS

| | | | |
|---|---|---|---|
| 10,743,299 B2* | 8/2020 | Yi | ........................ H04L 5/0057 |
| 2012/0020230 A1* | 1/2012 | Chen | .................... H04L 1/0028 |
| | | | 370/252 |
| 2013/0142139 A1 | 6/2013 | Kitazoe et al. | |
| 2014/0162642 A1 | 6/2014 | Kwon et al. | |

(Continued)

OTHER PUBLICATIONS

Huawei: "Consideration on UE RF capability in CA", 3GPP Draft; R4-102608, 3rd Generation Partnershi P Project (3GPP), Mobile Competence Centre ; 650, Route Des Lucioles ; F-06921 Sophia-Antipolis Cedex ; France, vol. RAN WG4, No. Bratislava; Jun. 28,2010, Jul. 1, 2010 (Jul. 1, 2010), XP050454813, pp. 1-3. [retrieved on Jul. 1, 2010].

(Continued)

*Primary Examiner* — John Pezzlo
(74) *Attorney, Agent, or Firm* — Arent Fox LLP

(57) ABSTRACT

Apparatus and methods of wireless communications operating in a wideband new radio (NR) system include identifying a system bandwidth value of a cell, and identifying a user equipment (UE) bandwidth capability. Additionally, the aspects include determining a UE-specific set of bandwidth parts each having a UE-specific bandwidth based on the system bandwidth value and the UE bandwidth capability, and communicating with the cell using at least one of the UE-specific set of bandwidth parts. Further, the described apparatus and methods may enable dual-mode operations in a wideband component carrier (CC)) in the NR system.

19 Claims, 11 Drawing Sheets

(56) References Cited

U.S. PATENT DOCUMENTS

2014/0254438 A1    9/2014  Long et al.
2017/0041112 A1    2/2017  Kim et al.
2018/0084593 A1    3/2018  Chen et al.
2018/0219576 A1    8/2018  Bhattad et al.
2018/0279310 A1    9/2018  Chen et al.

OTHER PUBLICATIONS

Intel Corporation: "Wide Bandwidth Operation and UE Capability", 3GPP Draft; R1-1700389, 3rd Generation Partnership Project (3GPP), Mobile Competence Centre; 650, Route Des Lucioles; F-06921 Sophia-Antipolis Cedex; France, vol. RAN WG1, No. Spokane, USA; Jan. 16, 2017-Jan. 20, 2017, Jan. 16, 2017 (Jan. 16, 2017), pp. 1-4, XP051207926, Retrieved from the Internet: URL:http://www.3gpp.org/ftp/Meetings_3GPP_SYNC/RAN1/Docs/.
International Search Report and Written Opinion—PCT/US2018/022447—ISA/EPO—dated May 28, 2018.
Samsung: "Wider Bandwidth Support in NR Single Carrier", 3GPP Draft; R2-168088, 3rd Generation Partnership Project (3GPP), Mobile Competence Centre; 650, Route Des Lucioles; F-06921, Sophia-Antipolis Cedex; France, vol. RAN WG2, No. Reno, USA; Nov. 14, 2016-Nov. 18, 2016, Nov. 13, 2016 (Nov. 13, 2016), XP051177784, pp. 4, Retrieved from the Internet: URL:http:ffhttp://www.3gpp.orgjftp/Meetings_3GPP_SYNC/RAN2/Docs/.

\* cited by examiner

TECHNIQUES FOR DUAL-MODE OPERATIONS IN NEW RADIO

CROSS-REFERENCE TO RELATED APPLICATIONS

This application for patent is a Continuation of U.S. patent application Ser. No. 15/920,043, titled "TECHNIQUES FOR DUAL-MODE OPERATIONS IN NEW RADIO", filed on Mar. 13, 2018, which claims priority to U.S. Provisional Application Ser. No. 62/476,472, entitled "DUAL-MODE OPERATION IN A WIDEBAND CC IN NR" and filed on Mar. 24, 2017, the entire contents of which are expressly incorporated by reference herein.

BACKGROUND

Aspects of the present disclosure relate generally to wireless communications, and more particularly, to techniques and schemes for dual-mode operations in a wireless communication network (e.g., in a wideband component carrier (CC)) in 5th Generation (5G) new radio (NR)).

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, single-carrier frequency-division multiple access (SC-FDMA) systems, and time-division synchronous code-division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE) or LTE-Advanced (LTE-A). Although newer multiple access systems, such as an LTE or LTE-A system, deliver faster data throughput than older technologies, such increased downlink rates have triggered a greater demand for higher-bandwidth content, such as high-resolution graphics and video, for use on or with mobile devices. In response, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband (eMBB) addressing human-centric use cases for access to multimedia content, services and data; ultra-reliable low-latency communications (URLLC) with strict requirements, especially in terms of latency and reliability; and massive machine type communications (mMTC) for a very large number of connected devices and typically transmitting a relatively low volume of non-delay-sensitive information. As the demand for mobile broadband access continues to increase, there exists a need for further improvements in NR communications technology and beyond. Preferably, these improvements should be applicable to other multi-access technologies and the telecommunication standards that employ these technologies.

Accordingly, due to the requirements for increased data rates, higher capacity, and lower latency, new approaches may be desirable to improve the system reliability and efficiency. For example, for NR communications technology and beyond, there may be difficulties in supporting different user equipments (UEs) having different UE capabilities. For instance, since the system bandwidth in NR may be up to 1 GHz, there may be challenges in supporting UEs having different bandwidth capabilities. Thus, improvements in wireless communication operations may be desired in order to satisfy consumer demand and improve user experience in wireless communications, e.g., NR communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the present disclosure includes a method of wireless communications by a user equipment (UE) including identifying a system bandwidth value of a cell, identifying a UE bandwidth capability, determining a UE-specific set of bandwidth parts each having a UE-specific bandwidth based on the system bandwidth value and the UE bandwidth capability, and communicating with the cell using at least one of the UE-specific set of bandwidth parts.

In another aspect, an apparatus (e.g., a UE) for wireless communications is provided that includes a transmitter, a memory configured to store instructions, and one or more processors communicatively coupled with the transmitter and the memory. For example, the one or more processors may be configured to execute the instructions to identify a system bandwidth value of a cell, identify a UE bandwidth capability, determine a UE-specific set of bandwidth parts each having a UE-specific bandwidth based on the system bandwidth value and the UE bandwidth capability, and communicate with the cell using at least one of the UE-specific set of bandwidth parts.

In yet another aspect, an apparatus (e.g., a UE) for wireless communications is provided that includes means for identifying a system bandwidth value of a cell, means for identifying a UE bandwidth capability, means for determining a UE-specific set of bandwidth parts each having a UE-specific bandwidth based on the system bandwidth value and the UE bandwidth capability, and means for communicating with the cell using at least one of the UE-specific set of bandwidth parts.

Moreover, in an aspect, a computer-readable medium (e.g., a non-transitory computer-readable storage medium) is provided storing code executable by at least one processor for wireless communications and comprising code for identifying a system bandwidth value of a cell, code for identifying a UE bandwidth capability, code for determining a UE-specific set of bandwidth parts each having a UE-specific bandwidth based on the system bandwidth value and the UE bandwidth capability, and code for communicating with the cell using at least one of the UE-specific set of bandwidth parts.

In another aspect, the present disclosure includes a method of wireless communications by a base station including identifying a system bandwidth value of a cell in which a UE is operating, identifying a UE bandwidth capability for the UE, determining a UE-specific set of bandwidth parts for the UE, each having a UE-specific bandwidth based on the system bandwidth value and the UE bandwidth capability, and communicating with the UE using at least one of the UE-specific set of bandwidth parts.

In a further aspect, the present disclosure also includes an apparatus or a base station having components or configured to execute or means for executing the above-described method, and computer-readable medium storing one or more codes executable by a processor to perform the above-described method. For example, a base station for wireless communications is provided that includes a transmitter, a memory configured to store instructions, and one or more processors communicatively coupled with the transmitter and the memory. In an example, at least one processor may be configured to execute the instructions to identify a system bandwidth value of a cell in which a UE is operating, identify a UE bandwidth capability for the UE, determine a UE-specific set of bandwidth parts for the UE, each having a UE-specific bandwidth based on the system bandwidth value and the UE bandwidth capability, and communicate with the UE using at least one of the UE-specific set of bandwidth parts.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
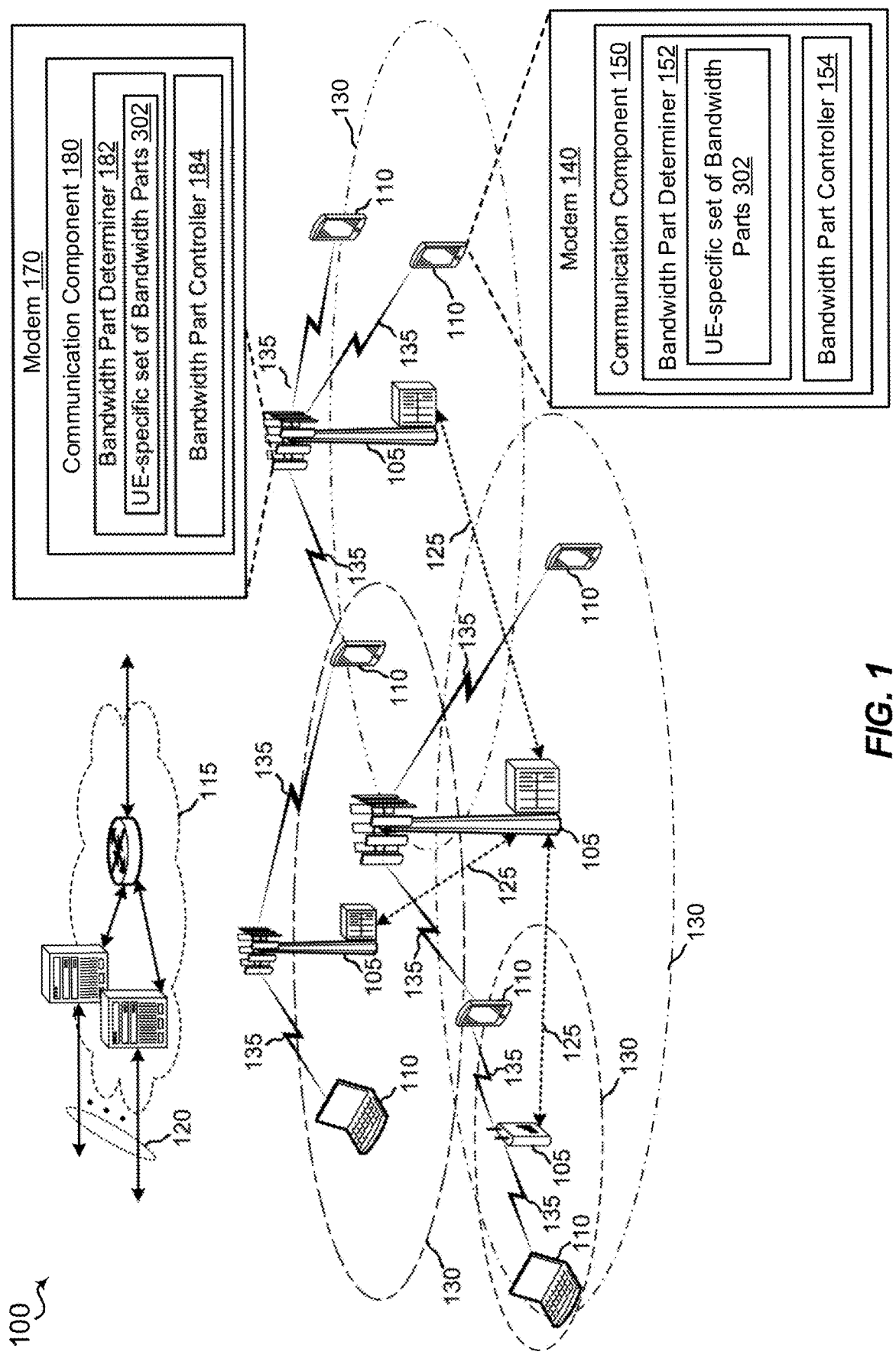
FIG. 1 is a schematic diagram of a wireless communication network including at least one UE and a base station having respective communication components for enabling operations of UEs with different bandwidth capabilities on a wideband component carrier (CC), according to an aspect of this disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to a wireless communication network, such as an NR technology network having a wideband component carrier (CC), and components on a UE and base station that configure and manage different types of UEs having different bandwidth capabilities to enable operations on the wideband CC. For example, the bandwidth capability may include, but is not limited to, radio frequency (RF) bandwidth capability. That is, this disclosure describes how the wideband CC, e.g., the system bandwidth, can be configured to exchange signaling between the UE and the base station when some UEs may have wideband capabilities while other UEs may have narrowband capabilities. In some examples, system bandwidth of a CC (e.g., the wideband CC) in an NR technology network (e.g., up to 1 GHz) may be larger than the system bandwidth of a CC in an LTE network (e.g., up to 20 MHz).

For instance, in one implementation, the UE and base station are configured to take into account a value (e.g., a frequency range, such as 100 MHz) of the system bandwidth, a minimum UE bandwidth capability (or reference capability) that is supported by the base station (e.g., a channel bandwidth of 20 MHz), and a bandwidth capability of the UE (e.g., a maximum channel bandwidth that UE can support), and thereby determine a UE-specific set of bandwidth parts (e.g., one or more portions of the system bandwidth) that may be used as channels or CCs for exchanging communications. As such, the wideband CC may be configured for dual-mode operations to support both the UEs having wideband capabilities and the UEs having narrowband capabilities by setting up differently configured UE-specific sets of bandwidth parts.

In other alternatives, this disclosure further describes other apparatus and methods at the UE and base station to manage or control other signaling or configurations based on one or more UE-specific sets of bandwidth parts. Examples of such other apparatus and methods may include managing one or more of synchronization channels and signaling, rate matching, bandwidth part aggregation, random sequence generation and usage, and configuration and interoperability of the one or more UE-specific sets of bandwidth parts with channel-quality channels and signaling.

Thus, the apparatus and methods of this disclosure may enable different configurations for UEs having different bandwidth capabilities to exchange signaling with the base station, thereby enabling dual-mode usage of the wideband CC (e.g., system bandwidth) in an NR technology-based wireless communication network.

Additional features of the present aspects are described in more detail below with respect to FIGS. 1-13.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to NR networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example of a wireless communication network 100, such as an NR technology network having a wideband component carrier (CC), includes at least one UE 110 with a modem 140 having a communication component 150 that enables UE 110 to exchange signaling with a modem 170 and a communication component 180 of at least one base station 105 (e.g., a gNB). Communication component 150 of UE 110 and communication component 180 of base station 105 may respectively include a bandwidth part determiner 152, 182 that enables UE 110 and base station 105 to determine how the wideband CC, e.g., the system bandwidth, can be configured to exchange signaling.

For instance, in one implementation, each bandwidth part determiner 152, 182 is configured to take into account a value (e.g., frequency range, such as 100 MHz) of the system bandwidth, a minimum UE bandwidth capability (or reference capability) that is supported by base station 105 (e.g., a channel bandwidth of 20 MHz), and a bandwidth capability of UE 110 (e.g., a maximum channel bandwidth that UE 110 can support), and thereby determine a UE-specific set of bandwidth parts 302 (e.g., one or more portions of the system bandwidth, 302-*a*, 302-*b*, 302-*c*, and/or 302-*d*) that will be used as channels or component carriers for exchanging communications. Different UEs 110 with different bandwidth capabilities may thus have differently configured UE-specific set of bandwidth parts 302.

Further, each bandwidth part controller 154, 184 is configured to work with respective modem 140, 170 and/or other components of UE 110 or base station 105 to ensure signaling is based on UE-specific set of bandwidth parts 302 determined for each UE 110.

In further alternatives, communication component 150 of UE 110 and communication component 180 of base station 105 may include one or more additional components to manage or control other signaling or configuration based on UE-specific set of bandwidth parts 302. Examples of such other components may include components managing one or more of synchronization channels and signaling, rate matching, bandwidth part aggregation, random sequence generation and usage, and configuration and interoperability of UE-specific set of bandwidth parts 302 with channel quality channels and signaling.

Thus, the apparatus and methods of this disclosure enable different configurations for UEs 110 having different bandwidth capabilities, thereby enabling dual-mode usage of the wideband CC (e.g., system bandwidth) in an NR technology-based wireless communication network 100.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNB, Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on internet protocol (IP). A user plane protocol stack (e.g., packet data convergence protocol (PDCP), radio link control (RLC), media access control (MAC), etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, radio resource control (RRC) protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operations on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communication network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mm-wave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Figure 2:
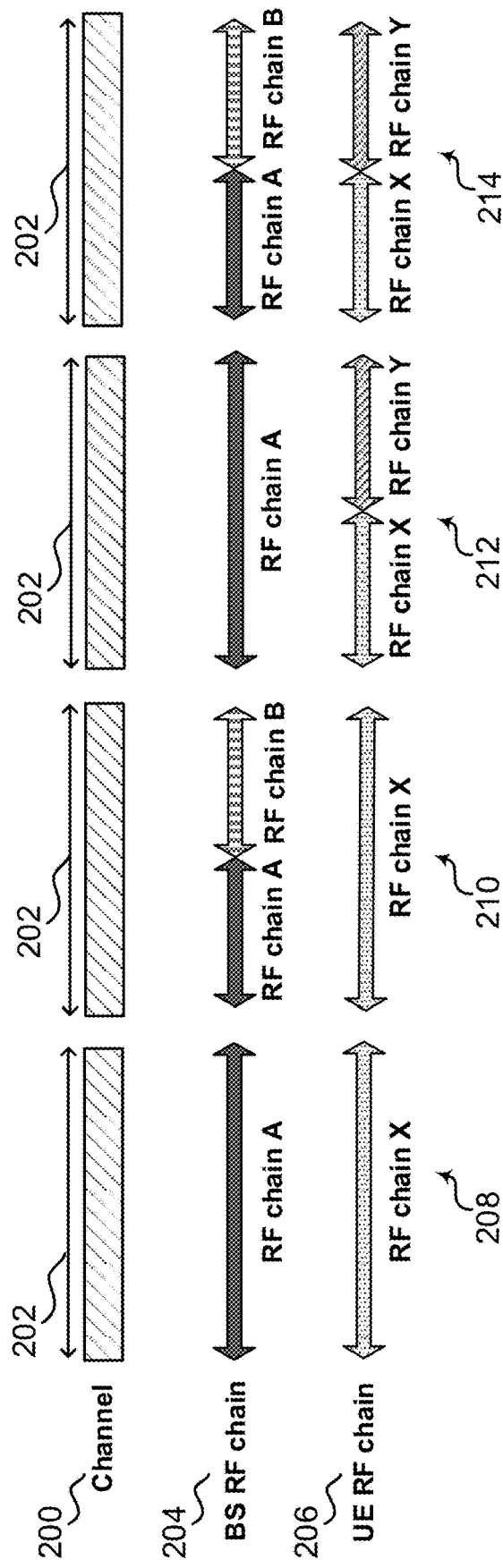
FIG. 2 is a series of schematic diagrams of examples of different use cases of UE and base station bandwidth capabilities with respect to a wideband channel, according to one or more aspects of this disclosure.

Referring to FIG. 2, a channel 200 in an NR wireless communication system 100 (FIG. 1) may be considered to be a wideband channel having a maximum channel bandwidth 202 larger, or substantially larger, than a maximum channel bandwidth in an LTE wireless communication system. For instance, in LTE, each channel (also referred to as a component carrier (CC)), can be up to 20 MHz, while in NR, each CC can have a much larger bandwidth, e.g., up to 1 GHz.

In an aspect of NR, it is expected that at least some UEs 110 may not be capable of supporting the maximum channel bandwidth that the base station 105 can support. For instance, different types of UEs 110 may support different maximum channel bandwidths, such as but not limited to a maximum channel bandwidth of 20 MHz, or 40 MHz, or 80 MHz, etc., while the base station 105 may support a maximum channel bandwidth of 200 MHz. Further, in another aspect, even if the UE 110 is capable of supporting a large bandwidth, the UE 110 or the base station 105 may implement the wideband using multiple radio frequency (RF) chains and multiple Fast Fourier Transform (FFT) components. In some implementations, base station 105 may support a wideband channel in a similar manner.

Thus, due to different types of UEs 110 and/or different types of base stations 105 having different bandwidth capabilities 204, 206 (e.g., RF bandwidth capabilities), respectively, it is possible that UE 110 and base station 105 may or may not support the same maximum channel bandwidth. For example, different use cases 208, 210, 212, 214 (respectively corresponding to Case 1, Case 2, Case 3, and Case 4) illustrate potential channel bandwidth capabilities 204, 206 of base station 105 and UE 110, respectively. In use case 208 (Case 1), UE 110 and base station 105 may have respective channel bandwidth capabilities 204, 206 to both support a single, wideband channel 200. In use case 210 (Case 2), UE 110 may have channel bandwidth capabilities 206 to support a single, wideband channel 200, while base station 105 may have channel bandwidth capabilities 204 to support a plurality (e.g., two in this example) of smaller channels (which may be referred to as narrowband channels) that span wideband channel 200. In use case 212 (Case 3), base station 105 may have channel bandwidth capabilities 204 to support a single, wideband channel 200, while UE 110 may have channel bandwidth capabilities 206 to support a plurality (e.g., two in this example) of smaller channels (e.g., narrowband channels) that span wideband channel 200. In use case 214 (Case 4), base station 105 and UE 110 may have respective channel bandwidth capabilities 204, 206 to each support a plurality (e.g., two in this example) of smaller channels (e.g., narrowband channels) that span wideband channel 200.

In some examples, UE 110 and base station 105 may support operations over about a 1 GHz contiguous spectrum, including a maximum single carrier bandwidth of at least 80 MHz. Further, UE 110 and base station 105 may support one or more multi-carrier approaches, e.g., carrier aggregation (CA) or dual connectivity (DC), and/or operations in a non-contiguous spectrum. In some cases, UE 110 and base station 105 may support single-carrier operations, where the maximum bandwidth supported by some UE capabilities (or categories) may be less than the channel bandwidth of serving single carrier. In some aspects, some UE capabilities (or categories) may or may not support the channel bandwidth of the serving single carrier.

In some examples, for each NR carrier (e.g., an NR CC), UE 110 and base station 105 may support operations using a maximum channel bandwidth of 400 MHz, 800 MHz, or 1000 MHz (1 GHz). In other words, the UE 110 and base station 105 may support operations using a maximum channel bandwidth per NR carrier of [400, 800, 1000] MHz. In an aspect, the UE 110 and base station 105 may support operations using a maximum channel bandwidth up to 100 MHz per NR carrier. In another aspect, operations using a maximum channel bandwidth of at least 100 MHz per NR carrier may be supported by the UE 110 and base station 105. Further, the UE 110 and base station 105 may support operating differently in different frequency bands. For instance, for sub-6 GHz operations, 100 MHz may be used for the maximum channel bandwidth, while maximum channel bandwidth wider than 100 MHz may be used for above-6 GHz operations. It should be noted that the UE 110 and base station 105 may support operations using a maximum channel bandwidths, e.g., 40 MHz or 200 MHz, or using scalable design(s) for up to a maximum channel bandwidth per NR carrier.

Additionally, UE 110 and base station 105 may support operations using a maximum number of NR carriers for CA and/or DC. For instance, although not limited hereto, such a maximum number of NR carriers may be selected from the set [8, 16, 32]. Also, in some cases, but not limited hereto, the maximum FFT size is not larger than one of the set of [8192, 4096, 2048] for the operations discussed herein. Further, in another case, if the maximum channel bandwidth is greater than or equal to 400 MHz and smaller than or equal to 1000 MHz (1 GHz), then the maximum number of channels (e.g., maximum number of NR carriers or CCs) in any aggregation may be either 8 or 16 (but is not limited thereto). In another case, if the maximum channel bandwidth is greater than or equal to 100 MHz, then the maximum number of CCs in any aggregation could be either 16 or 32 (but is not limited thereto). In yet another case, if the maximum channel bandwidth is greater than 100 MHz and smaller than 400 MHz, then the maximum number of CCs may be determined to be one of the above-noted values or a new value configured by system operators.

Figure 3:
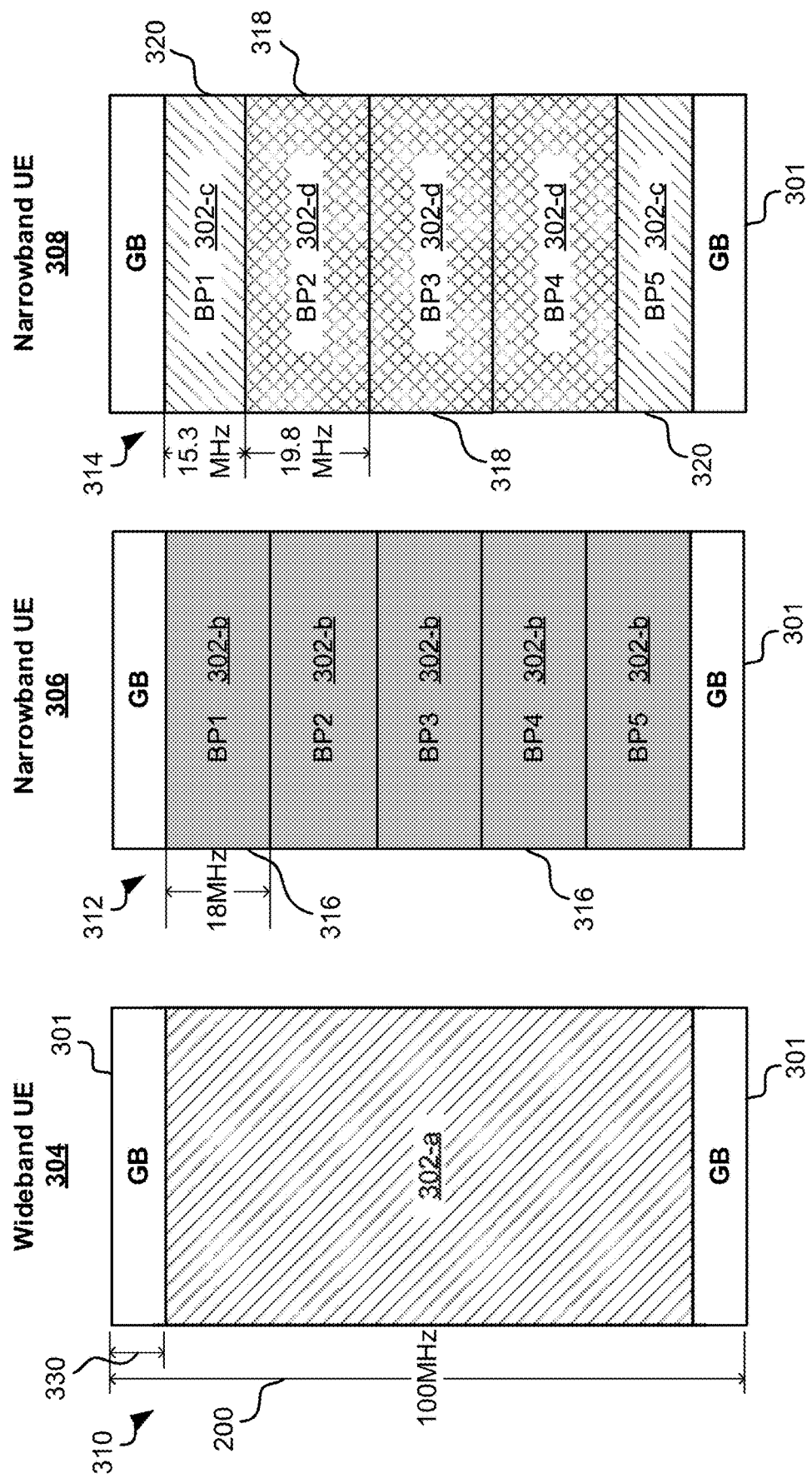
FIG. 3 is a series of schematic diagrams of examples of different UE-specific sets of bandwidth parts to respectively support operations of a wideband UE, a first narrowband UE, and a second narrowband UE, each having different bandwidth capabilities, with base station having wideband system bandwidth.

Referring to FIG. 3, a base station 105 (e.g., or a cell of the base station 105) may serve one or more UEs 110 capable of supporting wideband signals, while also serving one or more other UEs 110 that are not capable of supporting wideband signals. In some examples, for a dual-mode operation, wideband channel 200 may be organized or configured into a set of one or more bandwidth parts (BPs) 302 (e.g., 302-a, 302-b, 302-c, and/or 302-d), based on channel bandwidth capability 206 of a respective UE 110. For example, each bandwidth part 302 may be a separate channel or carrier. As such, for a wideband capable UE 304 and two narrowband capable UEs 306, 308 (e.g., UEs 306, 308 may be different, and may not be capable of supporting wideband signals), wideband channel 200 may be configured into respective UE-specific sets of bandwidth parts: set 310, set 312, and set 314. In an aspect, each UE-specific set of bandwidth parts of sets 310, 312, and 314 may have one or more BPs 302. Further, different bandwidth parts 302 of a respective UE-specific set of bandwidth parts (e.g., set 310, set 312, or set 314) can have a same size (or bandwidth range), such as BP size 316 for narrowband UE 306 and/or can have different sizes, or some combination of same and different sizes (e.g., BP size 318 and BP size 320 for narrowband UE 308).

As an example, the base station 105 (e.g., or a cell of the base station 105) may have a 100 MHz system bandwidth (e.g., channel bandwidth 200) which may be organized to have one bandwidth part 302-a, or five (5) BPs (e.g., five BPs 302-b, or two BPs 302-c plus three BPs 302-d). Assuming two (2) guard bands (GBs) 301 being 10 percent (10%) of the 100 MHz system bandwidth (totaling 10 MHz for two GBs, each GB 301 having a bandwidth 330 that equals to 5 MHz), there is 90 MHz in the cell that can be used for traffic. In an aspect, wideband UE 304 may be able to support the full system bandwidth, and thus may operate using a single carrier (e.g., a single BP 302-a with a size of 90 MHz). Although in one example wideband UE 304 may be described as using the BP 302-a, it should be understood that in some implementations that use of essentially the entire system bandwidth may not be considered using the BP 302-a. In some aspects, the use of BPs 302 may be considered to be associated with narrowband UEs, such as narrowband UE 306 and/or narrowband UE 308. In a first example, such as for narrowband UE 306, each bandwidth part 302-b is 18 MHz (indicated by 316). In a second example, such as for narrowband UE 308, each of the middle three (3) bandwidth parts 302-d has a large size (e.g., 19.8 MHz; indicated by 318), while each of the two (2) edge bandwidth parts 302-c has a smaller size (e.g., (90−19.8× 3)/2=15.3 MHz; indicated by 320).

In some aspects, the set of BPs 302 for a cell can be derived based on the system bandwidth and a minimum UE bandwidth capability supported or a reference capability (e.g., 20 MHz). Based on the reference set of BPs and a respective bandwidth capability 206, UE 110 can derive its own set of BPs, referred to as a UE-specific set of BPs (e.g., one or more sets of 310, 312, 314). For example, if UE 110 is capable of 40 MHz in a cell with 100 MHz system bandwidth, UE 110 may determine or be configured to have BP1 plus BP2 (BP1+BP2) as a first BP, BP3 plus BP4 (BP3+BP4) as a second BP, and BP5 as a third or the last BP in the UE-specific set of BPs. In this example, each BP of BP1, BP2, BP3, BP4, and BP5 (or BPs 302-b, 302-c, and 302-d) is no more than 20 MHz. As such, UE 110 may use the smallest BP size, e.g., a size that equals to or less than the reference capability, and build up a new set of BPs using this smallest size in combination with the UE bandwidth capability.

According to some implementations, in a dual-mode operation in a wideband system bandwidth using the UE-specific set of BPs, UE 110 and base station 105 may also account for other signaling. In some examples, the presence of synchronization channels or signals in one or more bandwidth parts may be determined by UE 110. For example, the synchronization channels or signals may include a Physical Broadcast Channel (PBCH), Primary Synchronization Signal (PSS), or Secondary Synchronization Signal (SSS). In one implementation, for instance, the presence of synchronization channels or signals may be indicated by base station 105 (e.g., a gNB). For example, base station 105 may transmit or broadcast a synchronization presence indicator. In some cases, the synchronization presence indicator may be a semi-static indication that included in a broadcast signal, or may be a dynamic indication. In an aspect, based on the indicated presence, UE 110 may perform rate matching for one or more other channels (e.g., a Physical Downlink Shared Channel (PDSCH)).

According to some implementations, in a dual-mode operation in a wideband system bandwidth using the UE-specific set of BPs, UE 110 that is a narrowband UE (e.g., with narrowband bandwidth capabilities) can perform BP (e.g., two or more PBs) aggregation. In some examples, the BP aggregation may be performed in a same way or similarly way compared to CA in an LTE network. In some aspects, among one or more BPs 302 that a narrowband UE 110 is being served, at least one BP 302 may carry synchronization (e.g., PSS, SSS) information or PBCH, etc. In an LTE network, each CC may have a respective synchronization signal or PBCH. In contrast, in an NR network (e.g., the NR technology-based wireless communication network 100), not every CC has a respective synchronization signal or PBCH, and UE 110 may utilize the synchronization information or PBCH in a first BP for a second BP. In an example, the second BP may not have synchronization information or PBCH.

According to some implementations, in a dual-mode operation in wideband system bandwidth using the UE-specific set of BPs, UE 110 and base station 105 may account for sequence generation. For example, random sequences may be used for scrambling, demodulation reference signal (DM-RS) modulation (e.g., used as DM-RS sequence(s)), channel interleaving, etc. In some examples, sequence generation may be applicable to DL and/or UL channels or signals. In an example, UE 110 and base station 105 may use one sequence generation scheme for all NR channels or signals. In another example, UE 110 and base station 105 may use different sequence generation schemes for different NR channels or signals.

In some aspects, UE 110 and base station 105 may implement one of at least two sequence generation schemes. In a first scheme, the sequence generation is based on wideband operations (e.g., a dual-mode operation in wideband system bandwidth). In other words, for example, both wideband and narrowband UEs can have the same sequence generation, making the system easier to have orthogonal multiplexing among these wideband and narrowband UEs. In an aspect, the narrowband UEs may take the corresponding portion of the sequence for a respective BP 302. In another aspect, the narrowband UEs may be indicated (e.g., by base station 105) a physical resource block (PRB) index and/or a BP index to determine the corresponding sequence and/or the corresponding portion of the sequence. For example, but not limited hereto, the PRB index or BP index indication may be included in a system information block (SIB), and may be received from base station 105 (e.g., via a broadcast signal).

In a second scheme, sequence generation is respectively performed or done per BP. For example, UE 110 or base station 105 may determine a respective BP 302, and perform sequence generation for the respective BP 302. In some implementations, the second scheme can be applicable to narrowband UEs only. In other implementations, the second scheme can also be used for wideband UEs. For example, the wideband UE 304 can stitch together the sequences for each BP 302 to form a sequence for the wider band.

Additionally, in some cases, sequence generation can be down-selected to have one sequence generation scheme for all NR channels or signals, or different sequence generation schemes for different channels or signals.

According to some implementations, in a dual-mode operation in wideband system bandwidth using the UE-specific set of BPs, UE 110 and base station 105 may account for management of one or more BPs 302 and subbands. In some examples, UE 110 and base station 105 may account for management of the one or more BPs 302 versus channel state information (CSI) subbands or sounding reference signal (SRS) subbands. For instance, CSI measurement, CSI reporting, or SRS transmission may be subband-based. In some aspects, the boundary of a CSI or SRS subband may be aligned with the boundary of a corresponding or respective BP 302. In some cases, if the boundaries may not be aligned, then UE 110 may drop the CSI (or SRS), or the CSI (or SRS) may be managed for a partial subband. That is, for example, the CSI and/or SRS may be transmitted with a subband spanning two BPs. Alternatively, the CSI and/or SRS may be transmitted partially only in one of the two adjacent BPs.

In some aspects, the management of subband size can be based on wideband or narrowband bandwidth capabilities of UE 110. For instance, in a first management scheme, same subband size(s) or location(s) can be used for both wideband and narrowband UEs 110. In a second management scheme, different subband sizes or locations can be used for wideband and narrowband UEs 110. For example, but not limited hereto, a wideband UE (e.g., wideband UE 304) may have a subband size of eight (8) resource blocks (RBs), while a first narrowband UE (e.g., with 40 MHz maximum channel bandwidth capability) may have a subband size of 4 RBs, and a second narrowband UE (e.g., with 20 MHz maximum channel bandwidth capability) may have a subband size of 2 RBs. It may be preferable to have such subband sizes be multiples of 2 in order to allow the different combinations to work well together.

According to some implementations, in dual-mode operation of wideband system bandwidth and when using the UE-specific set of BPs, downlink (DL) and uplink (UL) BPs 302 in a cell may be jointly or separately managed. In an example of joint management, both DL and UL have 5 BPs, and there is one-to-one correspondence. In an example of separate management, the DL has 5 BPs and the UL has 3 BPs, where the linkage between DL and UL BPs are indicated by base station 105. For example, base station 105 may transmit a DL/UL BP indicator, such as in a SIB.

In some implementations, UE 110 may be configured such that the DL and UL have the same capability. For instance, UE 110 may have DL and UL channel bandwidth both at 20 MHz.

In other implementations, UE 110 may be configured such at the DL and UL channel bandwidth capabilities are different. In one example, for instance, UE 110 may have DL channel bandwidth of 40 MHz and UL channel bandwidth of 20 MHz. Further, in some cases, UE 110 may separately derive the set of BPs for DL and UL.

Referring to FIGS. 4 through 10, in one example operation of a NR wireless communication system 100, a method 400 of wireless communications performed by UE 110 according to the above-described aspects includes one or more of the herein-defined actions.

Figure 4:
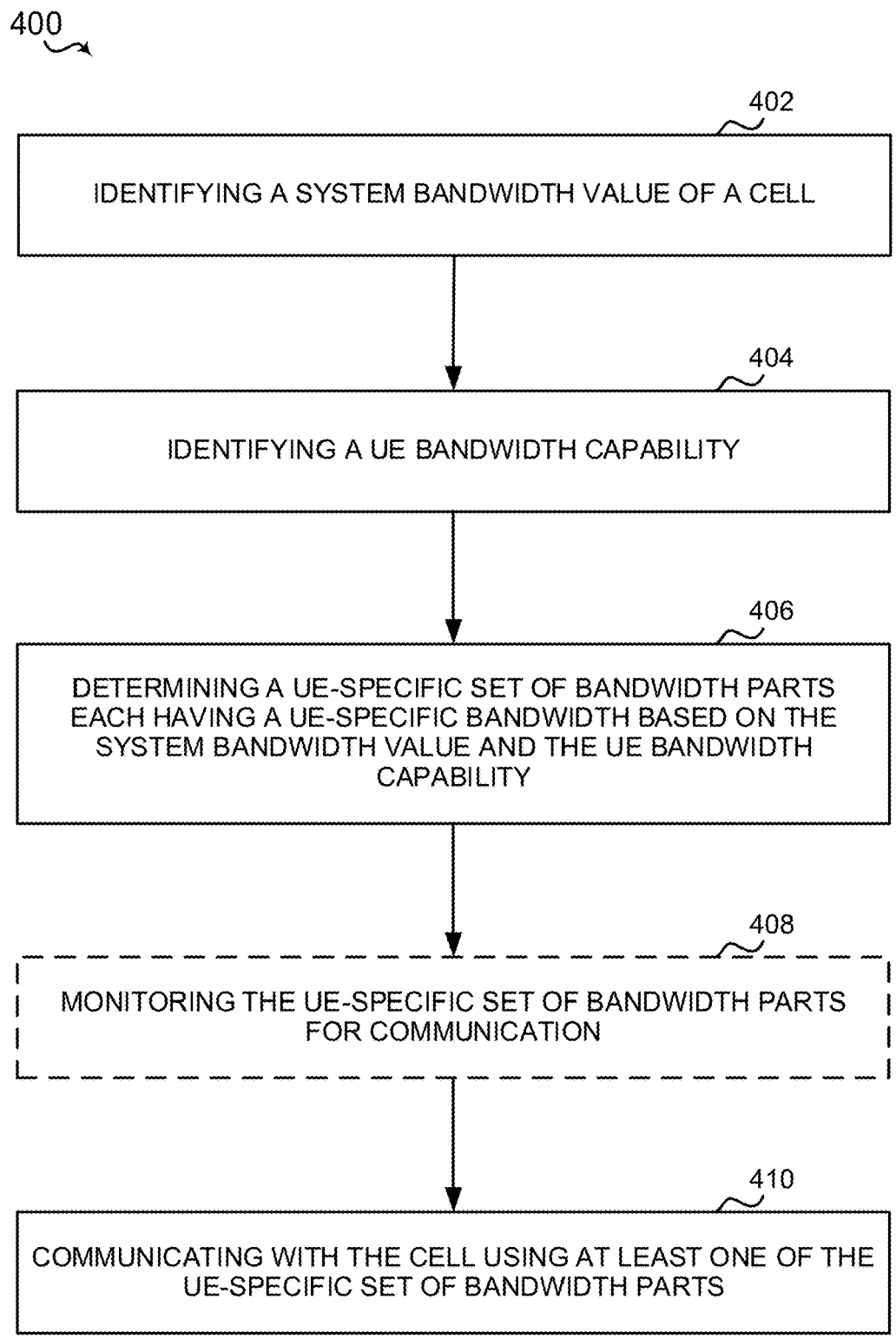
FIG. 4 is a flowchart of a method of wireless communications by a UE using at least one UE-specific set of bandwidth parts, according to one or more aspects of this disclosure.

Referring to FIG. 4, in an operational aspect, UE 110 (FIG. 1) may perform one or more aspects of a method 400 to perform dual-mode operations in a wireless communication network (e.g., an NR technology network) having at least a wideband CC. For example, as shown later in FIG. 12, one or more of processors 1212, memory 1216, the modem 140, transceiver 1202, and/or the communication component 150, may be configured to perform one or more aspects of the method 400.

In an aspect, at 402, method 400 includes identifying a system bandwidth value of a cell. For instance, in an aspect, UE 110 may execute communication component 150 and/or bandwidth part determiner 152 to identify a system bandwidth value of a cell, as described above, and in FIG. 2 or FIG. 3. For example, a cell or base station 105 may be configured to have at least one value (e.g., a frequency range, such as 100 MHz) of the system bandwidth, which may be used by DL/UL channels or CCs for exchanging communications with one or more UEs 110. In some implementations, UE 110 may identify or determine the system bandwidth value from exchanging communications with base station 105, for example, from a broadcast signal transmitted form base station 105.

In an aspect, at 404, method 400 includes identifying a UE bandwidth capability. For instance, in an aspect, UE 110 may execute communication component 150 and/or bandwidth part determiner 152 to identify a UE bandwidth capability. For example, a bandwidth capability of the UE may be a maximum channel bandwidth that UE can support, and can be configured to be capable of wideband (e.g., wideband UE 304) or narrowband (e.g., narrowband UE 306 or 308), as described above and in FIG. 2 or FIG. 3, or based on a wireless communication standard.

In an aspect, at 406, method 400 includes determining a UE-specific set of bandwidth parts each having a UE-specific bandwidth based on the system bandwidth value and the UE bandwidth capability. For instance, in an aspect, UE 110 may execute communication component 150 and/or bandwidth part determiner 152 to determine a UE-specific set of bandwidth parts (e.g., a UE-specific set of bandwidth parts 302 in FIG. 3), where each bandwidth part has a UE-specific bandwidth based on the system bandwidth value (identified at 402) and the UE bandwidth capability (identified at 404), as described above and in FIG. 2 or FIG. 3, or based on a wireless communication standard.

In another aspect, at 408, method 400 may optionally include monitoring the UE-specific set of bandwidth parts for communication. For example, in an aspect, UE 110 may execute communication component 150, bandwidth part determiner 152, and/or transceiver 1202 to monitor one or more signals from the cell or base station 105 using at least one of the UE-specific set of bandwidth parts, as described above and in FIG. 2 or FIG. 3.

In an aspect, at 410, method 400 includes communicating with the cell using at least one of the UE-specific set of bandwidth parts. For instance, in an aspect, UE 110 may execute communication component 150, bandwidth part controller 154, and/or transceiver 1202 to communicate with the cell or base station 105 using at least one of the UE-specific set of bandwidth parts, as described above and In FIG. 3. In a dual-mode operation, for example, wideband channel 200 may be organized or configured into a set of one or more BPs 302 (e.g., 302-a, 302-b, 302-c, and/or 302-d), based on channel bandwidth capability 206 of a respective UE 110. In some cases, UE 110 may be configured to transmit signals to, or receive signals from, base station 105 using the one or more BPs 302, based on the system bandwidth value (identified at 402) and the UE bandwidth capability (identified at 404).

In an example, each of the UE-specific set of bandwidth parts has a same bandwidth, at least two of the UE-specific set of bandwidth parts have different bandwidths, or some combination thereof, or the UE-specific set of bandwidth parts comprise a single bandwidth part having a frequency range substantially corresponding to the system bandwidth value.

Figure 5:
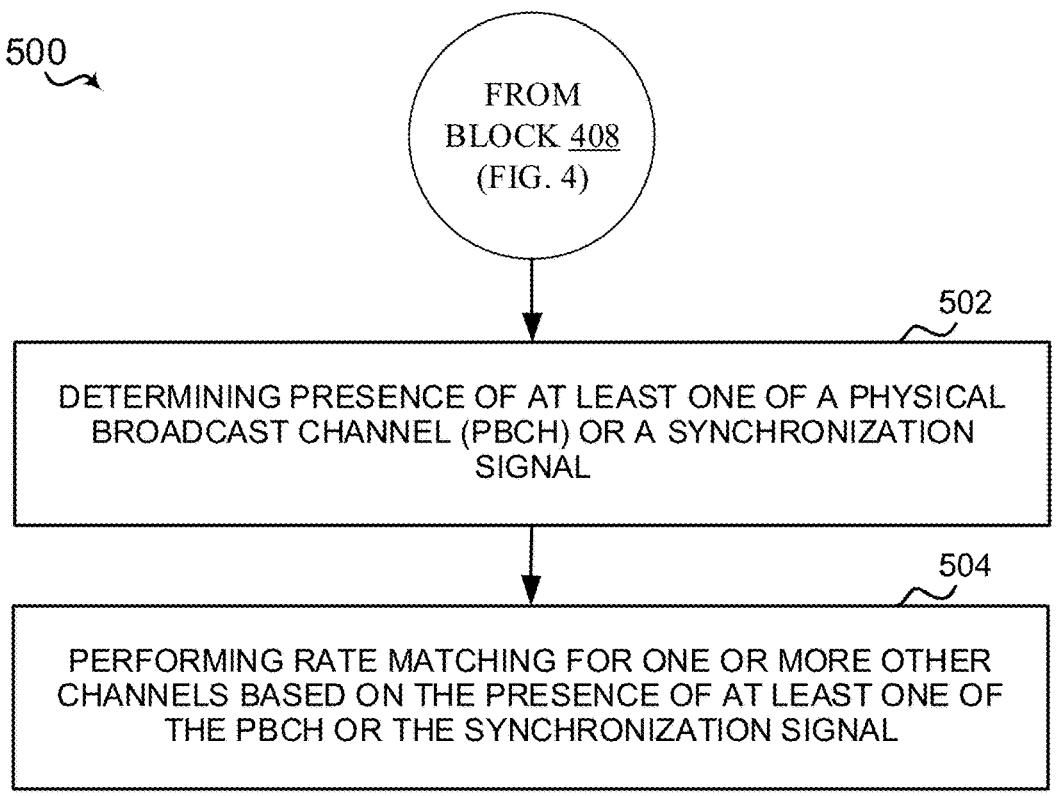
FIG. 5 is a flowchart that may continue from the method of FIG. 4 and that includes a method of detecting presence of signaling.

Referring to FIG. 5, method 500 may continue from one or more of the operations of method 400 in order to account for other signaling in the system bandwidth and/or in one or more of the bandwidth parts 302.

For example, at 502, method 500 may include determining presence of at least one of a PBCH or a synchronization signal. For instance, in an aspect, UE 110 may execute communication component 150, sync presence determiner 156, and/or transceiver 1202 to determine presence of at least one of a PBCH or a synchronization signal (e.g., PSS, SSS), as described above and in FIG. 3. In some cases, a PBCH or a synchronization signal (e.g., PSS, SSS) may be included or presented in one or more of the bandwidth parts 302, and may be transmitted from base station 105 to UE 110 in a DL signal. For example, base station 105 may transmit or broadcast a synchronization presence indicator in the DL signal.

In an aspect, at 504, method 500 may include performing rate matching for one or more other channels based on the presence of at least one of the PBCH or the synchronization signal. For instance, in an aspect, UE 110 may execute communication component 150 and/or rate matching component 158 and/or modem 140 to perform rate matching for one or more other channels based on the presence of at least one of the physical broadcast channel or the synchronization signal, as described above. In some cases, the synchronization presence indicator discussed above may be a semi-static indication that included in a broadcast signal, or may be a dynamic indication. In an aspect, based on the indicated presence, UE 110 may perform rate matching for one or more other channels (e.g., a PDSCH).

In some cases, determining the presence of at least one of the physical broadcast channel and the synchronization signal may include detecting in at least one of the UE-specific set of bandwidth parts. In other cases, determining the presence of at least one of the PBCH or the synchronization signal may further comprise detecting the presence in a first one of the UE-specific set of bandwidth parts, and may further include performing at least one of a timing tracking or a frequency tracking for the one or more other channels of a second one of the UE-specific set of bandwidth parts based on the detecting of the presence in the first one of the UE-specific set of bandwidth parts.

In some cases, performing rate matching for the one or more other channels of a second one of the UE-specific set of bandwidth parts is based on the determining of the presence in a first one of the UE-specific set of bandwidth parts is performed when the presence of at least one of the physical broadcast channel or the synchronization signal is not transmitted by the second one of the UE-specific set of bandwidth parts.

In some cases, determining the presence of at least one of the physical broadcast channel and the synchronization signal may include receiving a presence indicator transmitted by base station 105. For example, this may include receiving a broadcast channel or signal carrying the presence indicator.

Figure 6:
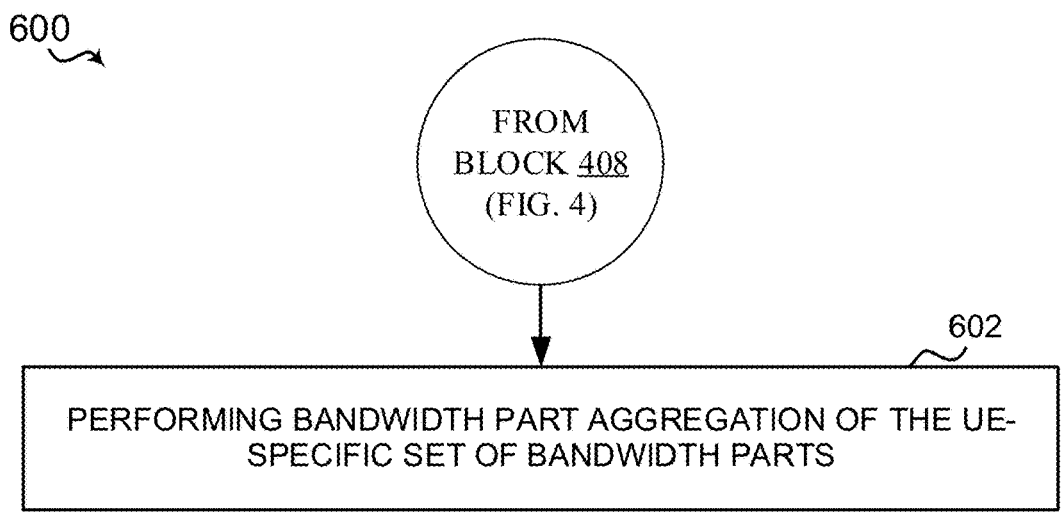
FIG. 6 is a flowchart that may continue from the method of FIG. 4 and that includes a method of performing bandwidth part(s) aggregation.

Referring to FIG. 6, method 600 may continue from the operations of method 400 in order to enable UE 110 to improve efficiency or throughput with respect to signaling. For example, at 602, method 600 includes performing bandwidth part aggregation of the UE-specific set of bandwidth parts. For instance, in an aspect, UE 110 may execute communication component 150, bandwidth part aggregator 160, modem 140, and/or transceiver 1202 to perform bandwidth part aggregation of the UE-specific set of bandwidth parts 302, as described above and in FIG. 3. In some examples, the UE-specific set of bandwidth parts 302 that can be BP aggregated may include one of intra-band contiguous bandwidths, intra-band non-contiguous bandwidths, or inter-band, non-contiguous bandwidths.

Figure 7A:
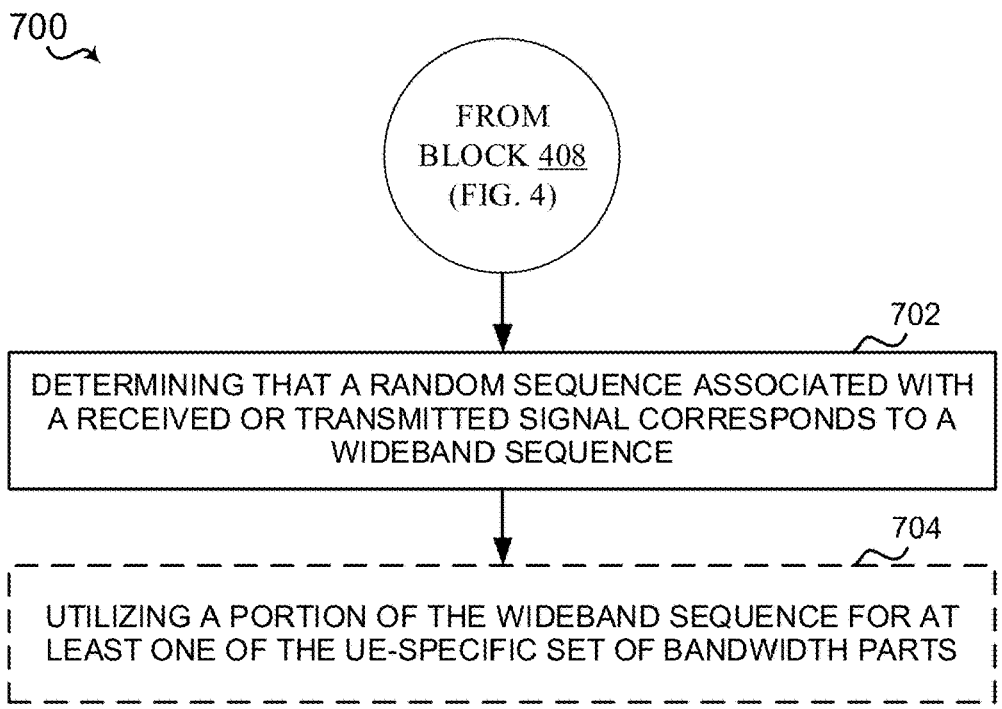
FIGS. 7A, 7B, and 8 are flowcharts that may continue from the method of FIG. 4 and that include alternative methods of determining a basis (wideband or per bandwidth part) or applicability of random sequences.

Referring to FIG. 7A, in an aspect, method 700 may continue from one or more of the operations of method 400 in order to enable UE 110 to manage wideband UL and/or DL signaling. For instance, signaling by UE 110 and/or base station 105 may utilize sequence generation, such as to apply a random sequence that can be used for scrambling or descrambling, for a DM-RS modulation sequence, or for channel interleaving, etc. In some examples, sequence generation can be applicable to DL and/or UL channels/signals.

For example, at 702, method 700 includes determining that a random sequence associated with a received or transmitted signal corresponds to a wideband sequence. For instance, in an aspect, UE 110 may execute communication component 150, sequence manager 162, modem 140, and/or transceiver 1202 to determine that a random sequence associated with a received or transmitted signal corresponds to a wideband sequence, as described herein. In some cases, the received or transmitted signal may be a reference signal, such as a demodulation reference signal.

In an aspect, at 704, method 700 may include utilizing a portion of the wideband sequence for at least one of the UE-specific set of bandwidth parts. For instance, in an aspect, UE 110 may execute communication component 150, sequence manager 162, signaling controller 166, modem 140, and/or transceiver 1202 to utilize a portion of the wideband sequence for at least one of the UE-specific set of bandwidth parts 302, as described herein.

Figure 7B:
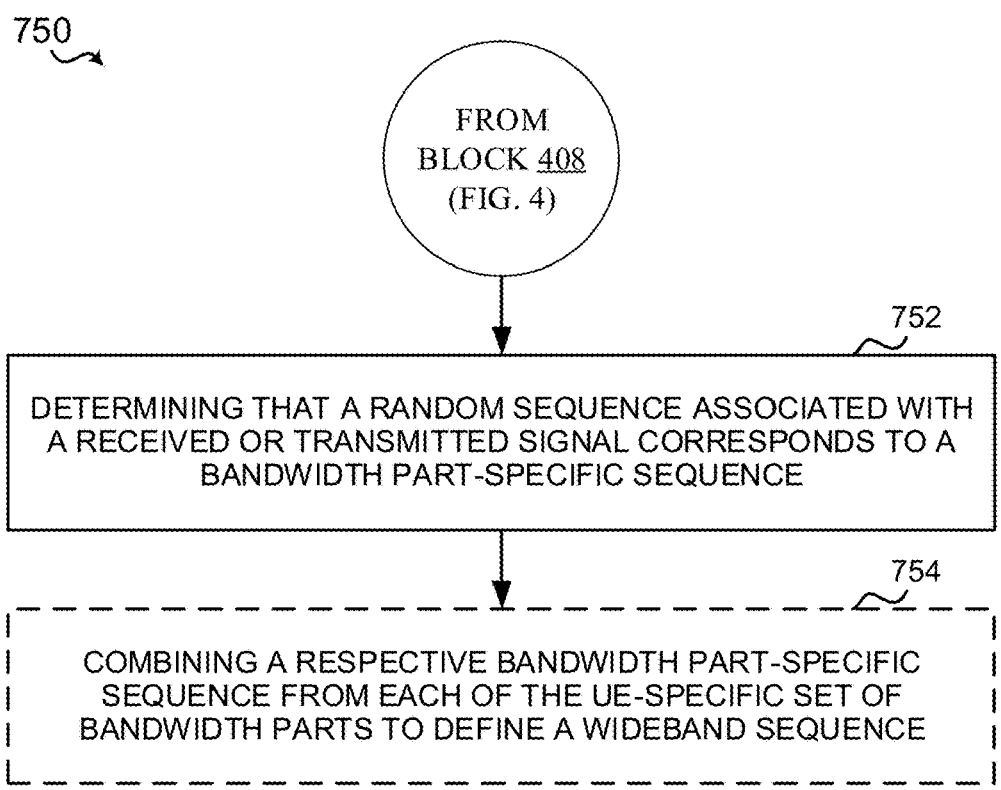

Referring to FIG. 7B, in another alternative, method 750 may continue from the operations of method 400 in order to enable UE 110 to manage signal generation and usage on a per BP basis, which may apply to both narrowband UEs and wideband UEs. For example, at 752, method 750 includes determining that a random sequence associated with a received or transmitted signal corresponds to a bandwidth part-specific sequence. For instance, in an aspect, UE 110 may execute communication component 150, sequence manager 162, signaling controller 166, modem 140, and/or transceiver 1202 to determine that a random sequence associated with a received or transmitted signal corresponds to a bandwidth part-specific sequence, as described herein.

In an alternative that may be used by a wideband UE (e.g., wideband UE 304), at 754, method 750 may include combining a respective bandwidth part-specific sequence from each of the UE-specific set of bandwidth parts to define a wideband sequence. For instance, in an aspect, UE 110 may execute communication component 150, sequence manager 162, signaling controller 166, modem 140, and/or transceiver 1202 to combine a respective bandwidth part-specific sequence from each of the UE-specific set of bandwidth parts to define a wideband sequence, as described herein. In other words, wideband UE 304 receiving or transmitting sequences that are generated on a per BP basis may stitch together the respective sequences to form a wideband sequence.

Figure 8:
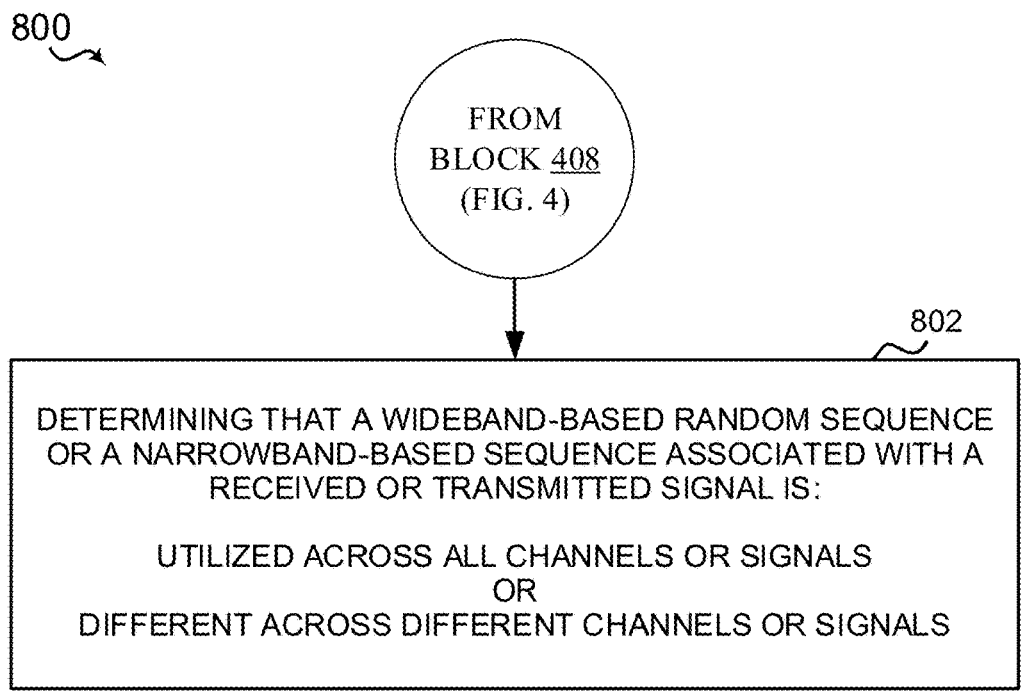

Referring to FIG. 8, in another alternative, method 800 may continue from the one or more operations of method 400 in order to enable UE 110 to manage sequence generation and usage in a same manner or in different manners. For example, at 802, method 800 includes determining that a wideband-based random sequence or a narrowband-based sequence associated with a received or transmitted signal is utilized across all channels or signals, or that a wideband-based random sequence or a narrowband-based sequence associated with a received or transmitted signal is different across different channels or signals. For instance, in an aspect, UE 110 may execute communication component 150, sequence manager 162, signaling controller 166, modem 140, and/or transceiver 1202 to determine that a wideband-based random sequence or a narrowband-based sequence associated with a received or transmitted signal is utilized across all channels or signals, or is different across different channels or signals.

Figure 9:
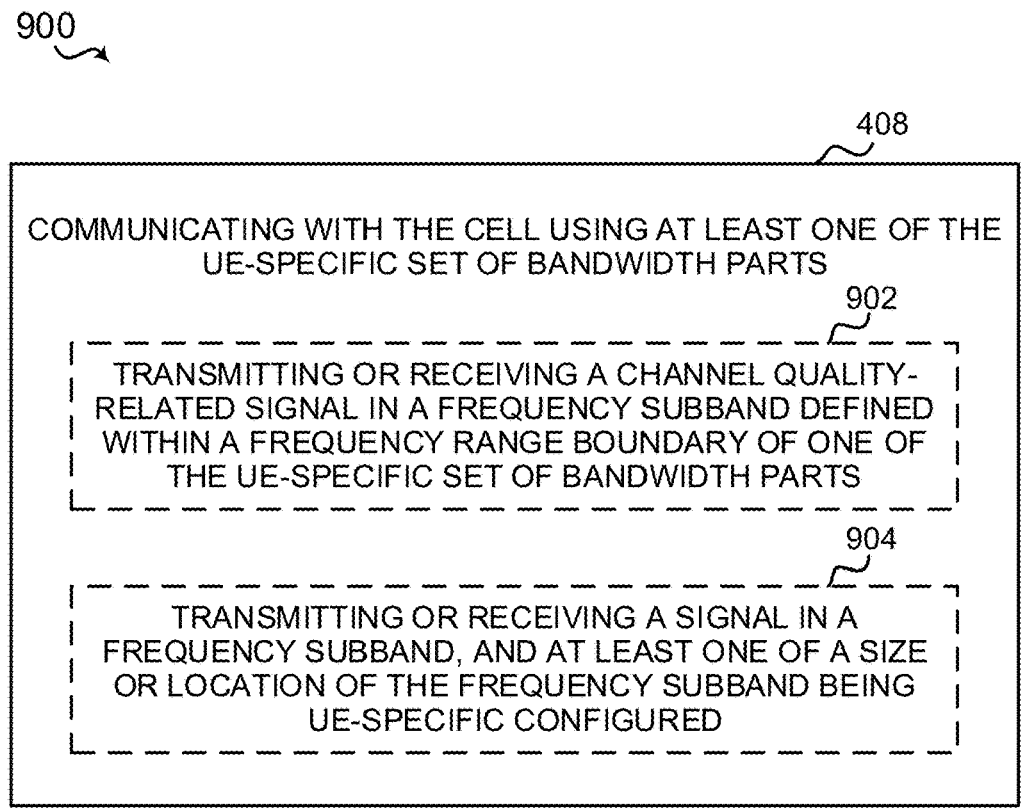
FIG. 9 is a flowchart that may continue from or be part of the method of FIG. 4 and that includes a method of transmitting or receiving a signal in a frequency subband.

Referring to FIG. 9, in some aspects relating to the configuration of BPs and the configuration of subbands for other signaling, method 900 may continue from the operations of method 400, or be part of an operation of the method 400 in order to enable UE 110 to utilize BPs and other signaling in subbands.

For example, being part of the operation of block 408, at 902, method 900 may optionally include transmitting or receiving a channel quality-related signaling in a frequency subband defined within a frequency range boundary of one of the UE-specific set of bandwidth parts. For instance, in an aspect, UE 110 may execute communication component 150, channel quality manager 164, signaling controller 166, modem 140, and/or transceiver 1202 to transmit or receive a channel quality-related signaling in a frequency subband defined within a frequency range boundary of one of the UE-specific set of bandwidth parts.

In another example, being part of the operation of block 408, at 904, method 900 may optionally include transmitting or receiving a signal in a frequency subband, and at least one of a size or location of the frequency subband being UE-specific configured. For instance, in an aspect, UE 110 may execute communication component 150, signaling controller 166, modem 140, and/or transceiver 1202 to transmit or receive a signal in a frequency subband. In some cases, at least one of the size or location of the frequency subband is UE-specific configured. In some examples, the size or location of the frequency subband is constant regardless of the UE bandwidth capability. In other cases, the size or location of the frequency subband is different depending on the UE bandwidth capability.

Figure 10:
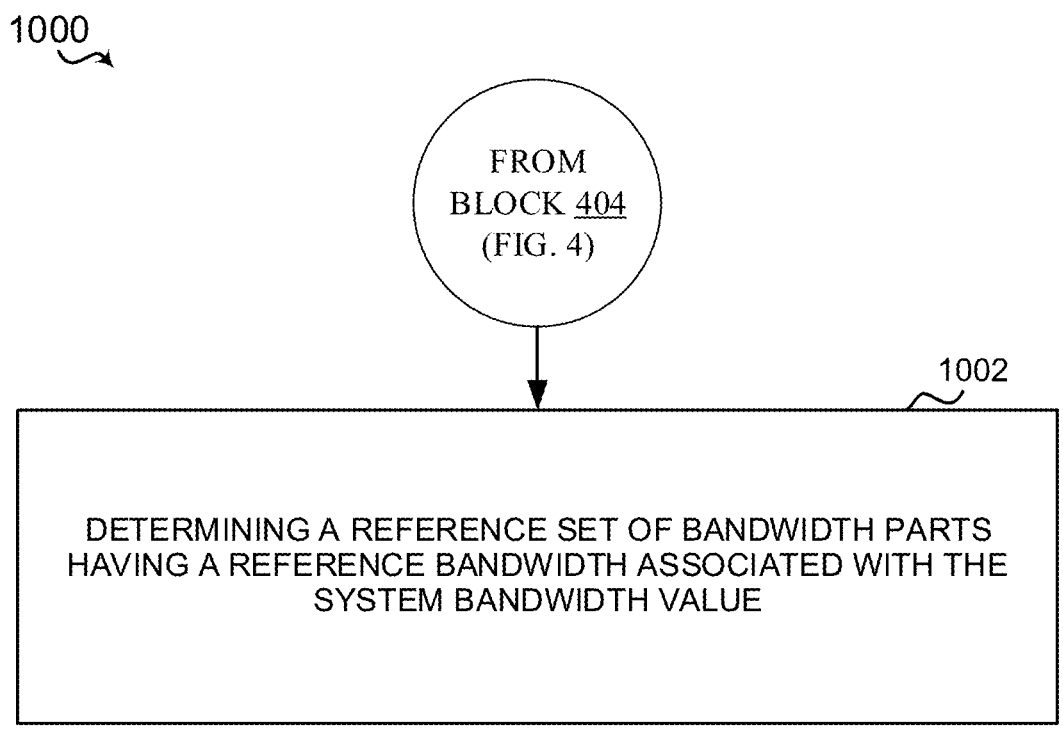
FIG. 10 is a flowchart that may continue from or be part of the method of FIG. 4 and that includes a method using a reference set of bandwidth parts.

Referring to FIG. 10, in some aspects relating to the configuration of BPs using a reference set of BPs, method 1000 may continue from the operations of method 400, or be part of an operation of the method 400 in order to enable UE 110 to utilize BPs and other signaling. For example, continuing from the operation of block 404, at 1002, method 1000 may include determining a reference set of bandwidth parts having a reference bandwidth associated with the system bandwidth value. For instance, in an aspect, UE 110 may execute communication component 150, and/or bandwidth part determiner 152 to determine a reference set of bandwidth parts having a reference bandwidth associated with the system bandwidth value identified at block 402. In an aspect, the UE-specific set of bandwidth parts 302 may be determined based on the reference set of bandwidth parts.

In another aspect relating to the configuration of BPs, method 400 may include determining that the UE-specific set of bandwidth parts are the same for DL and UL, or are different. That is, when the UE-specific set of bandwidth parts are determined to be the same for DL and UL, they may be paired (e.g., 3 DL BPs and 3 UL BPs). In contrast, when the UE-specific set of bandwidth parts are determined to be different for DL and UL, there will be a first set of BPs for downlink operation, and a second set of BPs, different in number (and/or bandwidth range) from the first set, for uplink operation. For instance, in an aspect, UE 110 may execute communication component 150, bandwidth part determiner 152, and/or bandwidth part controller 154 to determine that the UE-specific set of bandwidth parts are the same for DL and UL, or are different.

Figure 11:
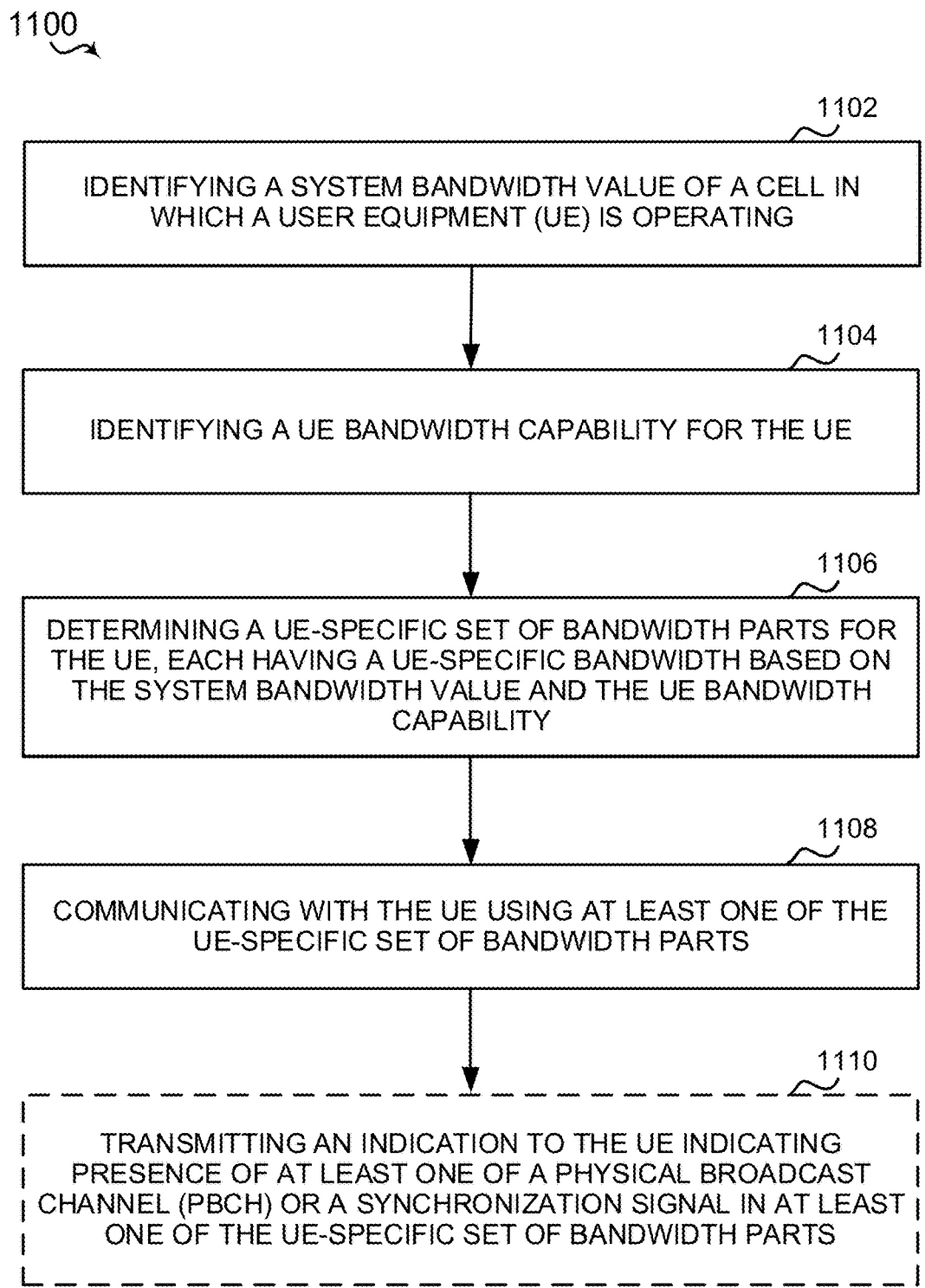
FIG. 11 is a flow diagram of an example of a method of wireless communications by a base station using at least one UE-specific set of bandwidth parts, according to one or more aspects of this disclosure.

Referring to FIG. 11, in an example, a method 1100 of wireless communications by base station 105 (FIG. 1) may include complimentary operations with respect to the operations of UE 110 as described above. In an operational aspect, base station 105 may perform one or more aspects of the method 1100 to perform dual-mode operations in a wireless communication network (e.g., an NR technology network) having at least a wideband CC. For example, as shown later in FIG. 13, one or more of processors 1312, memory 1316, the modem 170, transceiver 1302, and/or the communication component 180, may be configured to perform one or more aspects of the method 1100.

In an aspect, at 1102, for example, method 1100 may include identifying a system bandwidth value of a cell in which a UE is operating. For instance, in an aspect, base station 105 may execute communication component 180 and/or bandwidth part determiner 182 to identify a system bandwidth value of a cell in which UE 110 is operating, described above, and in FIG. 2 or FIG. 3. For example, a cell or base station 105 may be configured to have at least one value (e.g., a frequency range, such as 100 MHz) of the system bandwidth, which may be used by DL/UL channels or CCs for exchanging communications with one or more UEs 110.

In an aspect, at 1104, for example, method 1100 may include identifying a UE bandwidth capability for the UE. For instance, in an aspect, base station 105 may execute communication component 180 and/or bandwidth part determiner 182 to identify a UE bandwidth capability for the UE, as described above. For example, a bandwidth capability of the UE 110 may be a maximum channel bandwidth that UE 110 can support, and may be obtained from UE 110 which is capable of wideband (e.g., wideband UE 304) or narrowband (e.g., narrowband UE 306 or 308), as described above and in FIG. 2 or FIG. 3, or based on a wireless communication standard.

In an aspect, at 1106, for example, method 1100 may include determining a UE-specific set of bandwidth parts for the UE, each having a UE-specific bandwidth based on the system bandwidth value and the UE bandwidth capability. For instance, in an aspect, base station 105 may execute communication component 180, and/or bandwidth part determiner 182 to determine a UE-specific set of bandwidth parts for the UE, each having a UE-specific bandwidth based on the system bandwidth value and the UE bandwidth capability, as described above and in FIG. 2 or FIG. 3, or based on a wireless communication standard.

In an aspect, at 1108, for example, method 1100 may include communicating with the UE using at least one of the UE-specific set of bandwidth parts. For instance, in an aspect, base station 105 may execute communication component 180, bandwidth part controller 184, modem 170, and/or transceiver 1302 to communicate (e.g., transmit signaling) with the UE 110 in at least one of the UE-specific set of bandwidth parts, as described above and in FIG. 3. In a dual-mode operation, for example, base station 105 may organize or configure wideband channel 200 into a set of one or more BPs 302 (e.g., 302-a, 302-b, 302-c, and/or 302-d), based on channel bandwidth capability 206 of a respective UE 110. In some cases, base station 105 may be configured to transmit signals to, or receive signals from, UE 110 using one or more BPs 302, based on the system bandwidth value (identified at 1102) and the UE bandwidth capability (identified at 1104).

In an aspect, at 1110, for example, method 1100 may optionally include transmitting an indication to the UE indicating presence of at least one of a PBCH or a synchronization signal in at least one of the UE-specific set of bandwidth parts. For instance, in an aspect, base station 105 may execute communication component 180, bandwidth part controller 184, sync control manager 186, modem 170, and/or transceiver 1302 to transmitting an indication to the UE 110 indicating presence of at least one of a PBCH or a synchronization signal (e.g., PSS, SSS) in at least one of the UE-specific set of bandwidth parts, as described herein. In some examples, base station 105 may transmit or broadcast a message including the indication (e.g., a synchronization presence indicator). In some cases, the indication may be a semi-static indication that included in a broadcast signal, or may be a dynamic indication. In an implementation, the sync control manager 186 may be configured to manage one or more of PBCHs, synchronization channels, and related signaling.

In another aspect, for example, method 1100 may optionally include determining a reference set of bandwidth parts having a reference bandwidth associated with the system bandwidth value. For instance, in an aspect, base station 105 may execute communication component 180, and/or bandwidth part determiner 182 to determine a reference set of bandwidth parts having a reference bandwidth associated with the system bandwidth value, as described above and in FIG. 10.

In other alternatives, method 1100 may include additional actions, and base station 105 may include additional components, to manage or control other signaling or configurations based on UE-specific set of bandwidth parts. Examples of such other apparatus and methods may include a sequence manager 190 to manage random sequence generation and usage, a channel quality manager 192 to manage configuration and interoperability of UE-specific set of bandwidth parts with channel quality channels and signaling, or a signaling controller 188 to work with one or more other components to manage any base station signaling.

Figure 12:
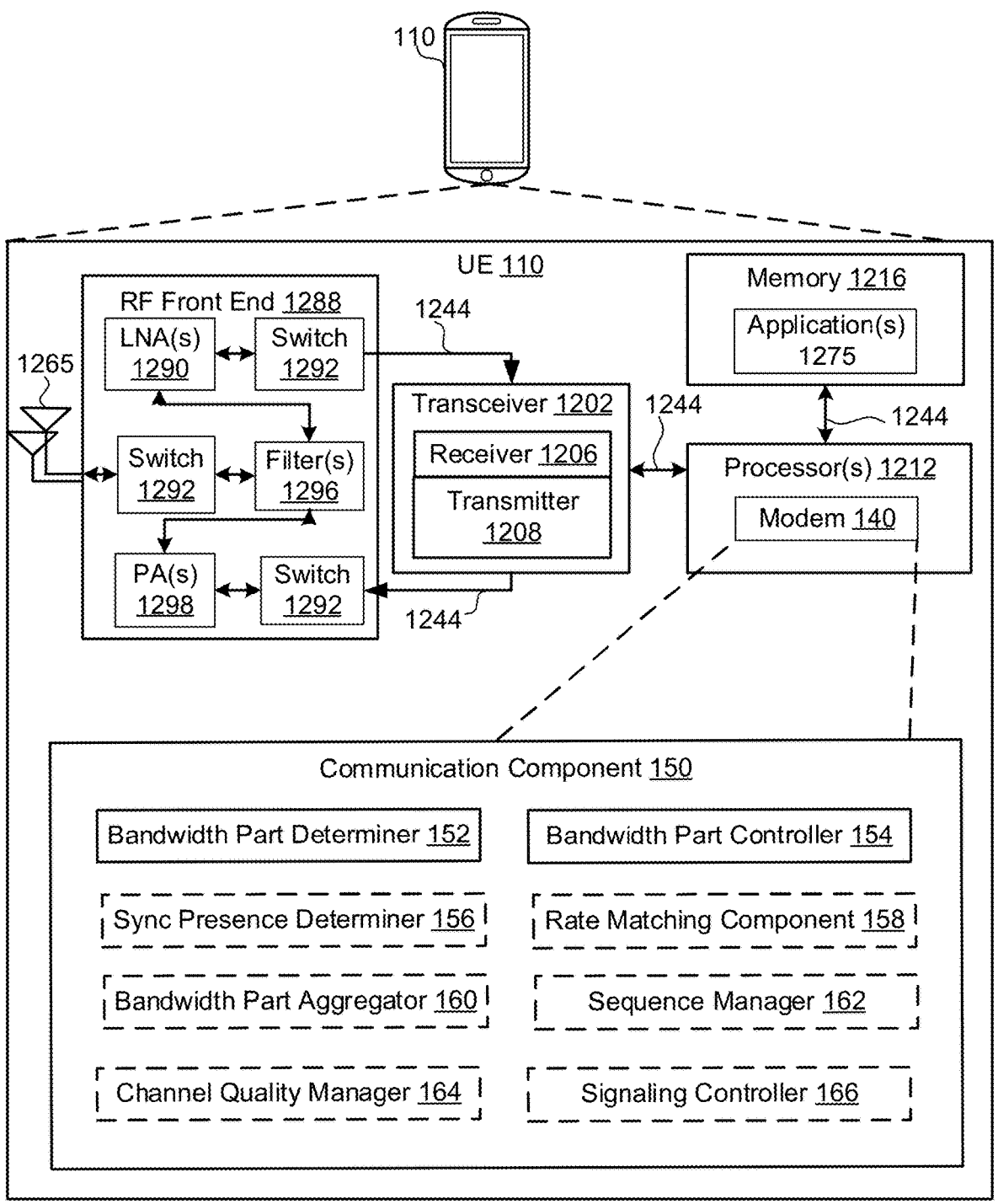
FIG. 12 is a schematic diagram of example components of the UE of FIG. 1.

Referring to FIG. 12, one example of an implementation of UE 110 may include a variety of components, some of which have already been described above, but including components such as one or more processors 1212 and memory 1216 and transceiver 1202 in communication via one or more buses 1244, which may operate in conjunction with modem 140 and communication component 150 to enable one or more of the functions described herein. Further, the one or more processors 1212, modem 140, memory 1216, transceiver 1202, RF front end 1288 and one or more antennas 1265, may be configured to support voice and/or data calls (simultaneously or non-simultaneously) in one or more radio access technologies.

In an aspect, the one or more processors 1212 can include one or more modems 140 that uses one or more modem processors. The various functions related to communication component 150 may be included in modem 140 and/or processors 1212 and, in an aspect, can be executed by a single processor, while in other aspects, different ones of the functions may be executed by a combination of two or more different processors. For example, in an aspect, the one or more processors 1212 may include any one or any combination of a modem processor, or a baseband processor, or a digital signal processor, or a transmit processor, or a receiver processor, or a transceiver processor associated with transceiver 1202. In other aspects, some of the features of the one or more processors 1212 and/or modem 140 associated with communication component 150 may be performed by transceiver 1202.

Also, memory 1216 may be configured to store data used herein and/or local versions of applications 1275 or communication component 150 and/or one or more of its subcomponents being executed by at least one processor 1212. Memory 1216 can include any type of computer-readable medium usable by a computer or at least one processor 1212, such as random access memory (RAM), read only memory (ROM), tapes, magnetic discs, optical discs, volatile memory, non-volatile memory, and any combination thereof. In an aspect, for example, memory 1216 may be a non-transitory computer-readable storage medium that stores one or more computer-executable codes defining communication component 150 and/or one or more of its subcomponents, and/or data associated therewith, when UE 110 is operating at least one processor 1212 to execute communication component 150 and/or one or more of its subcomponents.

Transceiver 1202 may include at least one receiver 1206 and at least one transmitter 1208. Receiver 1206 may include hardware, firmware, and/or software code executable by a processor for receiving data, the code comprising instructions and being stored in a memory (e.g., computer-readable medium). Receiver 1206 may be, for example, an RF receiver. In an aspect, receiver 1206 may receive signals transmitted by at least one base station 105. Additionally, receiver 1206 may process such received signals, and also may obtain measurements of the signals, such as, but not limited to, Ec/Io, SNR, RSRP, RSSI, etc. Transmitter 1208 may include hardware, firmware, and/or software code executable by a processor for transmitting data, the code comprising instructions and being stored in a memory (e.g., computer-readable medium). A suitable example of transmitter 1208 may including, but is not limited to, an RF transmitter.

Moreover, in an aspect, UE 110 may include RF front end 1288, which may operate in communication with one or more antennas 1265 and transceiver 1202 for receiving and transmitting radio transmissions, for example, wireless communications transmitted by at least one base station 105 or wireless transmissions transmitted by UE 110. RF front end 1288 may be connected to one or more antennas 1265 and can include one or more low-noise amplifiers (LNAs) 1290, one or more switches 1292, one or more power amplifiers (PAs) 1298, and one or more filters 1296 for transmitting and receiving RF signals.

In an aspect, LNA 1290 can amplify a received signal at a desired output level. In an aspect, each LNA 1290 may have a specified minimum and maximum gain values. In an aspect, RF front end 1288 may use one or more switches 1292 to select a particular LNA 1290 and its specified gain value based on a desired gain value for a particular application.

Further, for example, one or more PA(s) 1298 may be used by RF front end 1288 to amplify a signal for an RF output at a desired output power level. In an aspect, each PA 1298 may have specified minimum and maximum gain values. In an aspect, RF front end 1288 may use one or more switches 1292 to select a particular PA 1298 and its specified gain value based on a desired gain value for a particular application.

Also, for example, one or more filters 1296 can be used by RF front end 1288 to filter a received signal to obtain an input RF signal. Similarly, in an aspect, for example, a respective filter 1296 can be used to filter an output from a respective PA 1298 to produce an output signal for transmission. In an aspect, each filter 1296 can be connected to a specific LNA 1290 and/or PA 1298. In an aspect, RF front end 1288 can use one or more switches 1292 to select a transmit or receive path using a specified filter 1296, LNA 1290, and/or PA 1298, based on a configuration as specified by transceiver 1202 and/or processor 1212.

As such, transceiver 1202 may be configured to transmit and receive wireless signals through one or more antennas 1265 via RF front end 1288. In an aspect, transceiver may be tuned to operate at specified frequencies such that UE 110 can communicate with, for example, one or more base stations 105 or one or more cells associated with one or more base stations 125. In an aspect, for example, modem 140 can configure transceiver 1202 to operate at a specified frequency and power level based on the UE configuration of the UE 110 and the communication protocol used by modem 140.

In an aspect, modem 140 can be a multiband-multimode modem, which can process digital data and communicate with transceiver 1202 such that the digital data is sent and received using transceiver 1202. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 110 (e.g., RF front end 1288, transceiver 1202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

Figure 13:
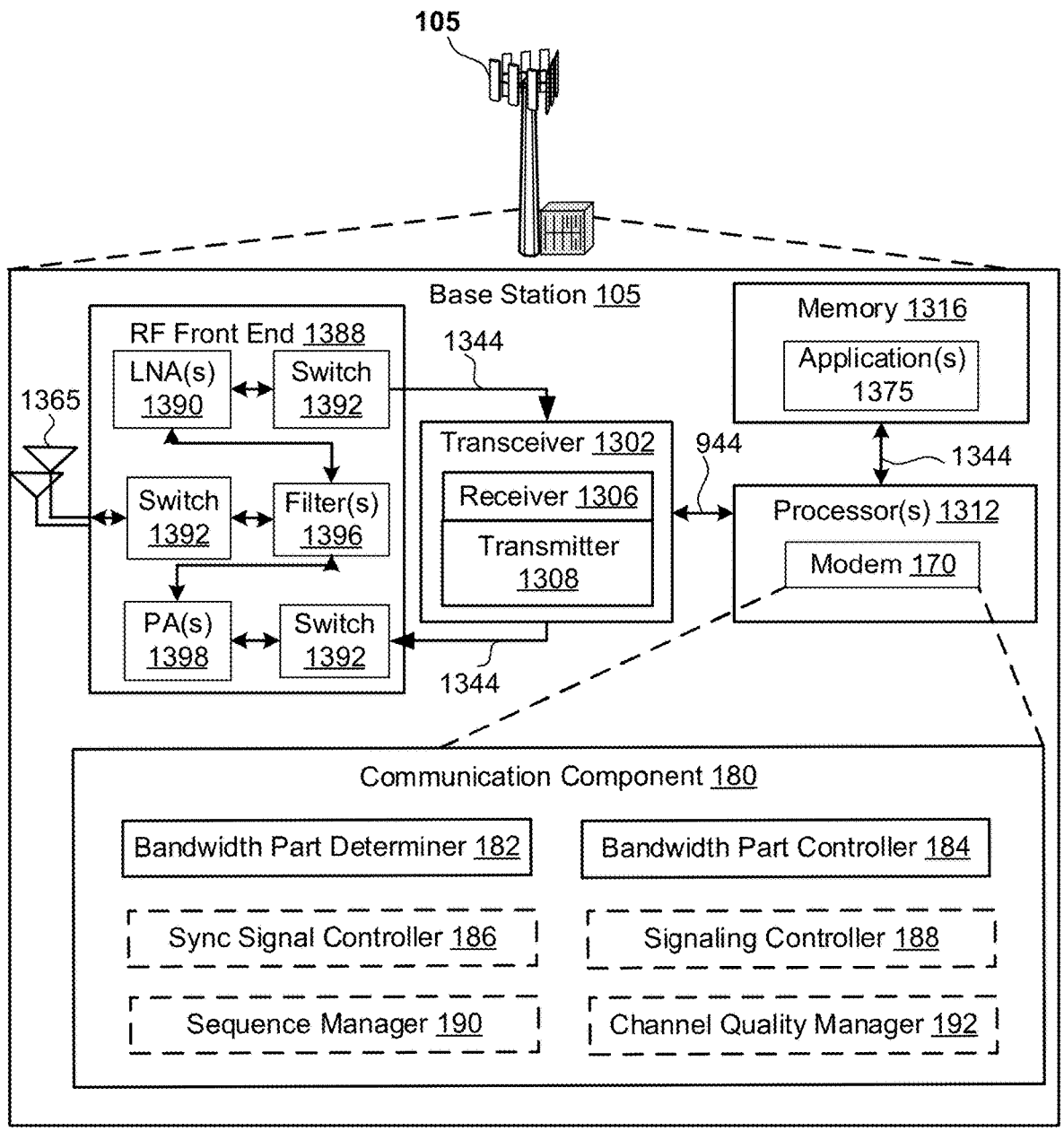
FIG. 13 is a schematic diagram of example components of the base station of FIG. 1.

Referring to FIG. 13, one example of an implementation of base station 105 may include a variety of components, some of which have already been described above, but including components such as one or more processors 1312 and memory 1316 and transceiver 1302 in communication via one or more buses 1344, which may operate in conjunction with modem 170 and communication component 180 to enable one or more of the functions described herein.

The transceiver 1302, receiver 1306, transmitter 1308, one or more processors 1312, memory 1316, applications 1375, buses 1344, RF front end 1388, LNAs 1390, switches 1392, filters 1396, PAs 1398, and one or more antennas 1365 may be the same as or similar to the corresponding components of UE 110, as described above, but configured or otherwise programmed for base station operations as opposed to UE operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communications by a user equipment (UE), comprising:
   identifying a system bandwidth value of a cell;
   identifying a UE bandwidth capability including a wideband capability or a narrowband capability;
   determining a UE-specific set of bandwidth parts each having a UE-specific bandwidth based on the system bandwidth value and the UE bandwidth capability, wherein the UE-specific set of bandwidth parts are determined to be a first set for a downlink operation and are determined to be a second set for an uplink operation, where the first set and the second set are different; and
   communicating with the cell using at least one of the UE-specific set of bandwidth parts.

2. The method of claim 1, wherein each of the UE-specific set of bandwidth parts has a same bandwidth.

3. The method of claim 1, wherein at least two of the UE-specific set of bandwidth parts have different bandwidths.

4. The method of claim 1, wherein the UE-specific set of bandwidth parts comprise a single bandwidth part having a frequency range substantially corresponding to the system bandwidth value.

5. The method of claim 1, further comprising:
   determining a reference set of bandwidth parts having a reference bandwidth associated with the system bandwidth value;
   wherein determining the UE-specific set of bandwidth parts is based on the determined reference set of bandwidth parts.

6. The method of claim 1, further comprising:
   monitoring the UE-specific set of bandwidth parts for communication.

7. The method of claim 1, further comprising determining that a random sequence associated with a received or transmitted signal corresponds to a wideband sequence.

8. The method of claim 7, further comprising utilizing a portion of the wideband sequence for at least one of the UE-specific set of bandwidth parts.

9. The method of claim 7, wherein the received or transmitted signal is a demodulation reference signal (DM-RS).

10. The method of claim 1, wherein the communicating further comprises transmitting or receiving a channel quality-related signal in a frequency subband defined within a frequency range boundary of one of the UE-specific set of bandwidth parts.

11. The method of claim 10, wherein at least one of a size or location of the frequency subband is associated with at least one of Channel State Information (CSI) or a Sounding Reference Signal (SRS).

12. The method of claim 1, wherein the communicating further comprises transmitting or receiving a signal in a frequency subband, and wherein at least one of a size or location of the frequency subband is UE-specific configured.

13. The method of claim 12, wherein at least one of the size or location of the frequency subband is determined based on a respective bandwidth part of the UE-specific set of bandwidth parts.

14. The method of claim 1, wherein the UE-specific set of bandwidth parts are the same for downlink and uplink.

15. A user equipment (UE) for wireless communications, comprising:
   a memory storing instructions; and
   at least one processor in communication with the memory and configured to execute the instructions to:
      identify a system bandwidth value of a cell;
      identify a UE bandwidth capability including a wideband capability or a narrowband capability;
      determine a UE-specific set of bandwidth parts each having a UE-specific bandwidth based on the system bandwidth value and the UE bandwidth capability, wherein the UE-specific set of bandwidth parts are determined to be a first set for a downlink operation and are determined to be a second set for an uplink operation, where the first set and the second set are different; and communicate with the cell using at least one of the UE-specific set of bandwidth parts.

16. A method of wireless communications by a base station, comprising:

identifying a system bandwidth value of a cell in which a user equipment (UE) is operating;

identifying a UE bandwidth capability for the UE including a wideband capability or a narrowband capability;

determining a UE-specific set of bandwidth parts for the UE, each having a UE-specific bandwidth based on the system bandwidth value and the UE bandwidth capability, wherein the UE-specific set of bandwidth parts are determined to be a first set for a downlink operation and are determined to be a second set for an uplink operation, where the first set and the second set are different; and communicating with the UE using at least one of the UE-specific set of bandwidth parts.

17. The method of claim 16, wherein:

each of the UE-specific set of bandwidth parts has a same bandwidth, or at least two of the UE-specific set of bandwidth parts have different bandwidths.

18. The method of claim 16, further comprising:

transmitting an indication to the UE indicating presence of at least one of a physical broadcast channel (PBCH) or a synchronization signal in at least one of the UE-specific set of bandwidth parts.

19. A base station for wireless communications, comprising:

a memory storing instructions; and at least one processor in communication with the memory and configured to execute the instructions to:

identify a system bandwidth value of a cell in which a user equipment (UE) is operating;

identify a UE bandwidth capability for the UE including a wideband capability or a narrowband capability;

determine a UE-specific set of bandwidth parts for the UE, each having a UE-specific bandwidth based on the system bandwidth value and the UE bandwidth capability, wherein the UE-specific set of bandwidth parts are determined to be a first set for a downlink operation and are determined to be a second set for an uplink operation, where the first set and the second set are different; and communicate with the UE using at least one of the UE-specific set of bandwidth parts.

* * * * *